US012659895B2

(12) United States Patent
Bao et al.

(10) Patent No.: US 12,659,895 B2
(45) Date of Patent: Jun. 16, 2026

(54) SYNCHRONIZATION REFERENCE SOURCE SELECTION FOR CLOCK SYNCHRONIZATION

(71) Applicant: QUALCOMM Incorporated, San Diego, CA (US)

(72) Inventors: Jingchao Bao, San Diego, CA (US); Sony Akkarakaran, Poway, CA (US); Alexandros Manolakos, Escondido, CA (US); Xiaoxia Zhang, San Diego, CA (US); Lorenzo Ferrari, Castro Valley, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 17/760,352

(22) PCT Filed: Mar. 12, 2021

(86) PCT No.: PCT/US2021/022093
§ 371 (c)(1),
(2) Date: Aug. 8, 2022

(87) PCT Pub. No.: WO2021/183876
PCT Pub. Date: Sep. 16, 2021

(65) Prior Publication Data
US 2023/0097699 A1     Mar. 30, 2023

(30) Foreign Application Priority Data

Mar. 13, 2020     (GR) ............................... 20200100133

(51) Int. Cl.
*H04W 72/04*     (2023.01)
*H04W 56/00*     (2009.01)

(52) U.S. Cl.
CPC .............................. *H04W 56/0015* (2013.01)

(58) Field of Classification Search
CPC ............. H04W 56/0015; H04W 56/001; H04J 3/0638; H04J 3/0641
See application file for complete search history.

(56) References Cited

U.S. PATENT DOCUMENTS

2012/0250704 A1* 10/2012 Yamada ................ H04J 3/0661
370/503
2015/0222413 A1* 8/2015 Pietilainen ............ H04J 3/0667
709/248

(Continued)

FOREIGN PATENT DOCUMENTS

CN         106464396 A      2/2017
CN         106664675 A      5/2017

(Continued)

OTHER PUBLICATIONS

CATT: "Synchronization Enhancements in PC5-Based V2V", 3GPP Draft, 3GPP TSG RAN WG1 Meeting #83, R1-156603, 3rd Generation Partnership Project (3GPP), Mobile Competence Centre, 650, Route Des Lucioles, F-06921 Sophia-Antipolis Cedex France, vol. RAN WG1. No. Anaheim, USA, Nov. 15, 2015-Nov. 2, 2015 Nov. 15, 2015 (Nov. 15, 2015), XP051039888, 8 Pages, Retrieved from the Internet: URL:http://www.3gpp.org/ftp/Meetings_3GPP_SYNC/RAN1/Docs/ [retrieved on Nov. 15, 2015] Section 2.2, figure 1.

(Continued)

*Primary Examiner* — Mahbubul Bar Chowdhury
(74) *Attorney, Agent, or Firm* — Harrity & Harrity, LLP

(57)                ABSTRACT

Various aspects of the present disclosure generally relate to wireless communication. In some aspects, a wireless communication device may select a synchronization reference source, of a plurality of available synchronization reference sources, based at least in part on a clock accuracy indicator (Continued)

400 ⟶

410 ~ Select a synchronization reference source, of a plurality of available synchronization reference sources, based at least in part on a clock accuracy indicator of the synchronization reference source 420 ~ Communicate with the synchronization reference source to synchronize a first clock of the wireless communication device with a second clock of the synchronization reference source of the synchronization reference source; and communicate with the synchronization reference source to synchronize a first clock of the wireless communication device with a second clock of the synchronization reference source. Numerous other aspects are provided.

22 Claims, 6 Drawing Sheets

(56) References Cited

U.S. PATENT DOCUMENTS

| | | | |
|---|---|---|---|
| 2016/0065322 A1* | 3/2016 | Cao | H04J 3/0658 |
| | | | 370/503 |
| 2016/0073370 A1* | 3/2016 | Axmon | H04W 56/0015 |
| | | | 370/350 |
| 2016/0249307 A1* | 8/2016 | Thangarasa | H04W 56/001 |
| 2017/0078985 A1 | 3/2017 | Zheng et al. | |
| 2018/0076984 A1 | 3/2018 | Yang et al. | |
| 2018/0139714 A1* | 5/2018 | Li | H04W 72/02 |
| 2018/0213500 A1* | 7/2018 | Li | H04W 56/00 |
| 2020/0287969 A1* | 9/2020 | Lv | H04J 3/0658 |
| 2020/0322910 A1* | 10/2020 | Zhang | H04W 4/70 |
| 2021/0091869 A1* | 3/2021 | Han | H04J 3/0638 |
| 2021/0136707 A1* | 5/2021 | Xu | H04W 56/0015 |
| 2022/0007232 A1* | 1/2022 | Sha | H04L 69/04 |
| 2022/0053439 A1* | 2/2022 | Hu | H04W 56/004 |

FOREIGN PATENT DOCUMENTS

| | | |
|---|---|---|
| CN | 107005958 A | 8/2017 |
| WO | 2019134653 A1 | 7/2019 |

OTHER PUBLICATIONS

Ericsson: "UE and gNB Measurements for NR Positioning", 3GPP Draft, 3GPP TSG RAN WG1 #98, R1-1909426 UE GNB Measurements, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051766031, 17 pages, Retrieved from the Internet: URL:http://www.3gpp.org/ftp/tsg_ran/WG1_RL1/TSGR1_98/Docs/R1-1909426.zip [retrieved on Aug. 16, 2019], Section 2.2.1 Section 2.2.2 Section 2.2.3 Section 2.2.4 figures 1. 2. 3. 6. 7, Section 2. 2.2. 3, Fig. 3.

Huawei, et al., "Corrections on 36.331 for ProSe", 3GPP Draft, 3GPP TSG-RAN2#89bis Meeting, 36331_CRXXXX_(REL-12)_R2-151056_Corrections on 36.331 for Prose, 3rd Generation Partnership Project (3GPP), Mobile Competence Centre, 650, Route Des Lucioles, F-06921 Sophia-Antipolis CE, vol. RAN WG2. No. Bratislava, Slovakia, Apr. 20, 2015-Apr. 24, 2015 Apr. 19, 2015 (Apr. 19, 2015), XP050936000, 11 Pages, Retrieved from the Internet: URL:http://www.3gpp.org/ftp/Meetings_3GPP_SYNC/RAN2/Docs/ [retrieved on Apr. 19, 2015] Section 5.10.7.1 Section 5.10.8.2 Section 5.10.9.

Intel Corporation: "Sidelink Synchronization for NR V2X Communication", 3GPP Draft, 3GPP TSG RAN WG1 Ad-Hoc Meeting 1901, R1-1900482 Intel—EV2X SL Sync, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593395, pp. 1-12.

International Search Report and Written Opinion—PCT/US2021/022093—ISA/EPO—Sep. 30, 2021.

LG Electronics: "Discussion on NR Sidelink Synchronization Mechanism", 3GPP Draft, 3GPP TSG RAN WG1 #100, R1-2000784, 3rd Generation Partnership Project (3GPP), Mobile Competence Centre, 650, Route Des Lucioles, F-06921 Sophia-Antipolis Cedex, France, vol. RAN WG1, No. E-Meeting, Feb. 24, 2020-Mar. 6, 2020 Feb. 15, 2020 (Feb. 15, 2020), XP051853442, pp. 1-12, Retrieved from the Internet: URL:https://ftp.3gpp.org/tsg_ran/WG1_RL1/TSGR1_100_e/Docs/R1-2000784.zip R1-2000784 Discussion on NR sidelink synchronization mechanism_LGE_r1.docx [retrieved on—Feb. 15, 2020] Section 2.4.

Partial International Search Report—PCT/US2021/022093—ISA/EPO—Jun. 25, 2021.

* cited by examiner

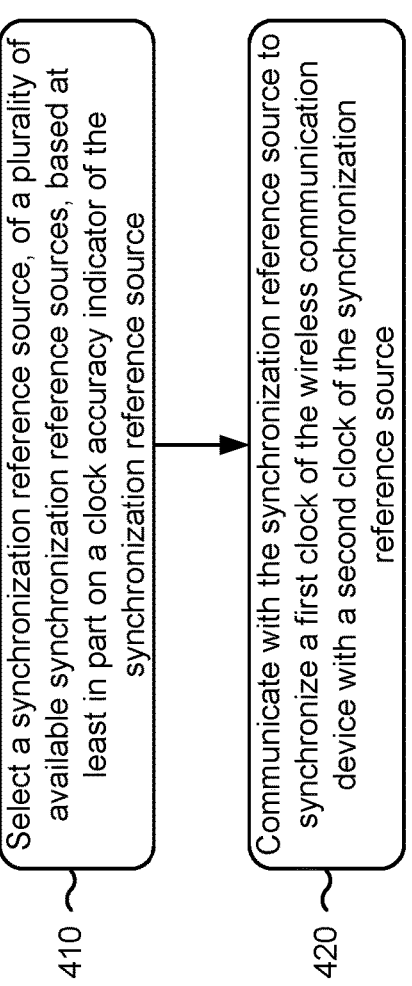

400

410 Select a synchronization reference source, of a plurality of available synchronization reference sources, based at least in part on a clock accuracy indicator of the synchronization reference source 420 Communicate with the synchronization reference source to synchronize a first clock of the wireless communication device with a second clock of the synchronization reference source

FIG. 4

SYNCHRONIZATION REFERENCE SOURCE SELECTION FOR CLOCK SYNCHRONIZATION

CROSS-REFERENCE TO RELATED APPLICATIONS

This Patent Application is a 371 national stage of PCT Application No. PCT/US2021/022093 filed on Mar. 12, 2021, entitled "SYNCHRONIZATION REFERENCE SOURCE SELECTION FOR CLOCK SYNCHRONIZA-TION," which claims priority to Greek Patent Application No. 20200100133, filed on Mar. 13, 2020, entitled "SYN-CHRONIZATION REFERENCE SOURCE SELECTION FOR CLOCK SYNCHRONIZATION," which are hereby expressly incorporated by reference herein.

FIELD OF THE DISCLOSURE

Aspects of the present disclosure generally relate to wireless communication and to techniques and apparatuses for synchronization reference source selection for clock synchronization.

BACKGROUND

Wireless communication systems are widely deployed to provide various radio frequency (RF) telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal fre-quency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Part-nership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promul-gated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broad-band access continues to increase, further improvements in LTE, NR, and other radio access technologies remain useful.

SUMMARY

In some aspects, a method of wireless communication, performed by a wireless communication device, may include selecting a synchronization reference source, of a plurality of available synchronization reference sources, based at least in part on a clock accuracy indicator of the synchronization reference source; and communicating with the synchronization reference source to synchronize a first clock of the wireless communication device with a second clock of the synchronization reference source.

In some aspects, a wireless communication device for wireless communication may include a memory and one or more processors operatively coupled to the memory. The memory and the one or more processors may be configured to select a synchronization reference source, of a plurality of available synchronization reference sources, based at least in part on a clock accuracy indicator of the synchronization reference source; and communicate with the synchroniza-tion reference source to synchronize a first clock of the wireless communication device with a second clock of the synchronization reference source.

In some aspects, a non-transitory computer-readable medium may store one or more instructions for wireless communication. The one or more instructions, when executed by one or more processors of a wireless commu-nication device, may cause the one or more processors to select a synchronization reference source, of a plurality of available synchronization reference sources, based at least in part on a clock accuracy indicator of the synchronization reference source; and communicate with the synchroniza-tion reference source to synchronize a first clock of the wireless communication device with a second clock of the synchronization reference source.

In some aspects, an apparatus for wireless communication may include means for selecting a synchronization reference source, of a plurality of available synchronization reference sources, based at least in part on a clock accuracy indicator of the synchronization reference source; and means for communicating with the synchronization reference source to synchronize a first clock of the wireless communication device with a second clock of the synchronization reference source.

Aspects generally include a method, apparatus, system, computer program product, non-transitory computer-read-able medium, user equipment, base station, wireless com-munication device, and/or processing system as substan-tially described herein with reference to and as illustrated by the drawings and specification.

The foregoing has outlined rather broadly the features and technical advantages of examples according to the disclo-sure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a wireless communication device, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
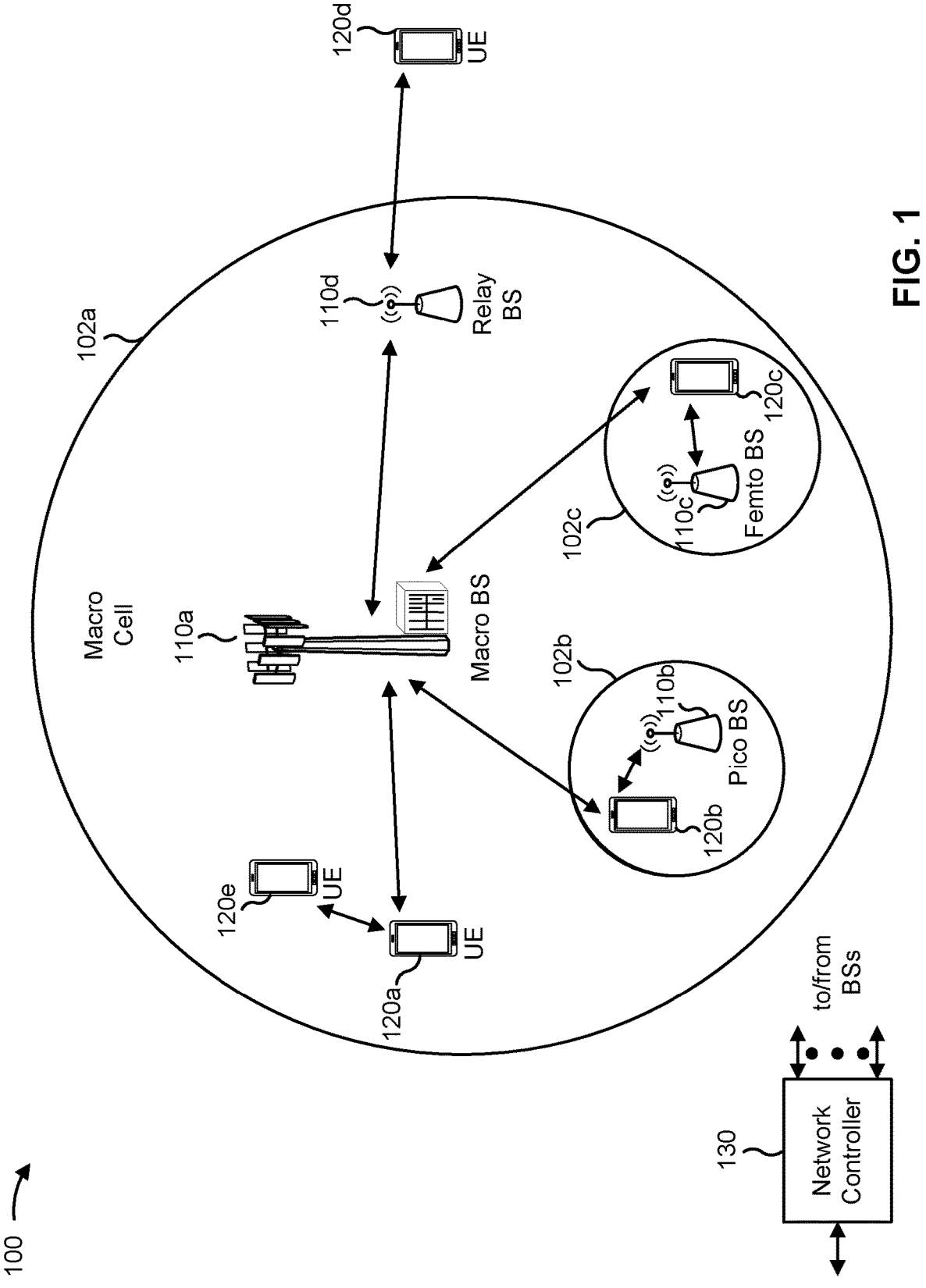
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
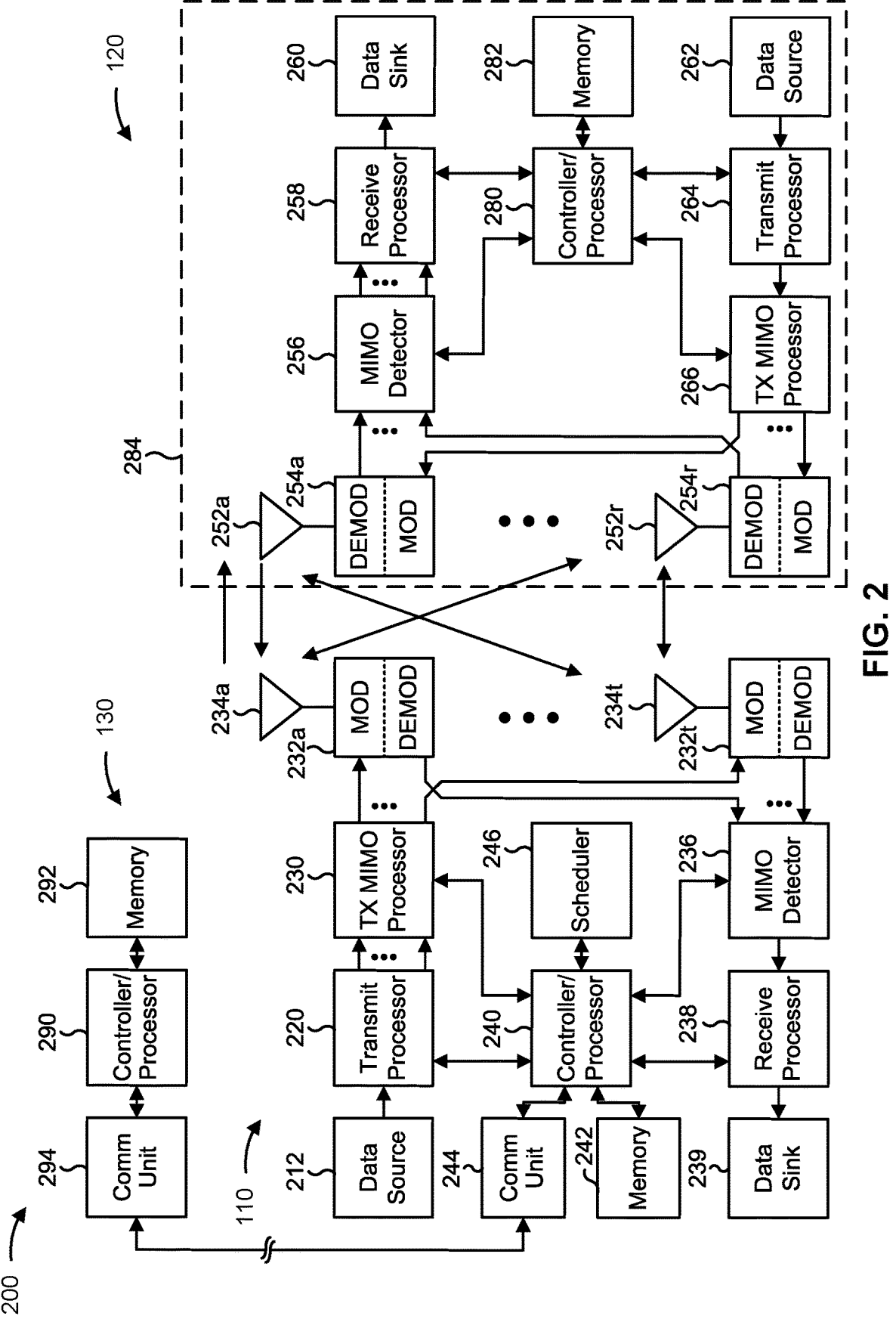
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3A-3C and 4).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3A-3C and 4).

Controller/processor 240 of base station 110, controller/processor 280 of UE 120, and/or any other component(s) of FIG. 2 may perform one or more techniques associated with synchronization reference source selection for clock synchronization, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions, among other examples.

In some aspects, a wireless communication device, such as BS 110, UE 120, and/or the like, may include means for selecting a synchronization reference source, of a plurality of available synchronization reference sources, based at least in part on a clock accuracy indicator of the synchronization reference source, means for communicating with the synchronization reference source to synchronize a first clock of the wireless communication device with a second clock of the synchronization reference source, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, clock synchronization may be used for synchronized communication, synchronized device control, and/or the like. Some wireless communication devices may include a global positioning system (GPS) clock to enable clock synchronization. However, other wireless communication devices may lack a GPS clock or may require a higher level of clock synchronization than is achieved using a GPS clock. For example, in machine-type-communications, precision manufacturing, controlled demolitions, and other types of use cases, precise clock synchronization may be needed. In a wired network, a wired device may use network time protocol (NTP) to achieve clock synchronization. For example, the wired device may transmit and/or receive information identifying a clock offset and/or a propagation time, from which a round-trip-time (RTT) value is determined to synchronize clocks.

However, in wireless communication, rather than a single path connecting a set of wired devices, a set of wireless communication devices may connect via a plurality of paths. For example, wireless communication devices may communicate via a line-of-sight (LOS) path, a set of non-line-of-sight (NLOS) paths, and/or the like. To determine a propagation time for achieving clock synchronization when a plurality of paths are possible, a wireless communication device may match a power delay profile (PDP) for a link to and a link from another wireless communication device, ensure that a PDP measurement is performed using a link with a threshold link capacity or quality (e.g., a threshold signal strength, bandwidth, reference signal received power, signal to interference noise ratio, signal to noise ratio, link capacity, and/or the like), and/or the like. Different synchronization reference sources (e.g., wireless communication devices with which a particular wireless communication device may attempt to synchronize a clock) may have different link capacities for a link with a particular wireless communication device. This may result in differing levels of synchronization accuracy when the particular wireless communication device attempts to use a particular link to communicate with another wireless communication device to synchronize a clock.

Moreover, each synchronization reference source may attempt to maintain clock synchronization with an ultimate synchronization reference source (e.g., a device that provides a network timing from which all other synchronization reference sources attempt to derive a synchronized timing). However, synchronization errors may compound across communication hops from the ultimate synchronization reference source. For example, a first BS may synchronize a first clock with, for example, a timing server with a first level of error, a relay BS may synchronize a second clock with the first clock with a second level of error (e.g., that is a sum of the first level of error and an additional level error), a UE may synchronize a third clock with the second clock with a third level of error (e.g., that is a sum of the second level of error and an additional level of error), and/or the like. This may result in some synchronization reference sources being more closely synchronized with the network time than others and/or being capable of enabling a higher level of synchronization for a particular wireless communication device than others.

Some aspects described herein enable selection of a synchronization reference source for clock synchronization. For example, a wireless communication device may determine accuracy levels for a plurality of synchronization reference sources and/or link capacities for links with the plurality of synchronization reference sources. Based at least in part on the accuracy levels and/or link capacities or qualities, the wireless communication device may select a particular synchronization reference source with which to communicate to perform a clock synchronization procedure. Additionally, or alternatively, the wireless communication device may select the particular reference source based at least in part on one or more other accuracy factors, such as a communication mode type, a PDP parameter, and/or the like. In this way, the wireless communication device ensures that a clock of the wireless communication device is synchronized with a higher level of accuracy relative to selecting a synchronization reference source using other techniques.

Figure 3A:
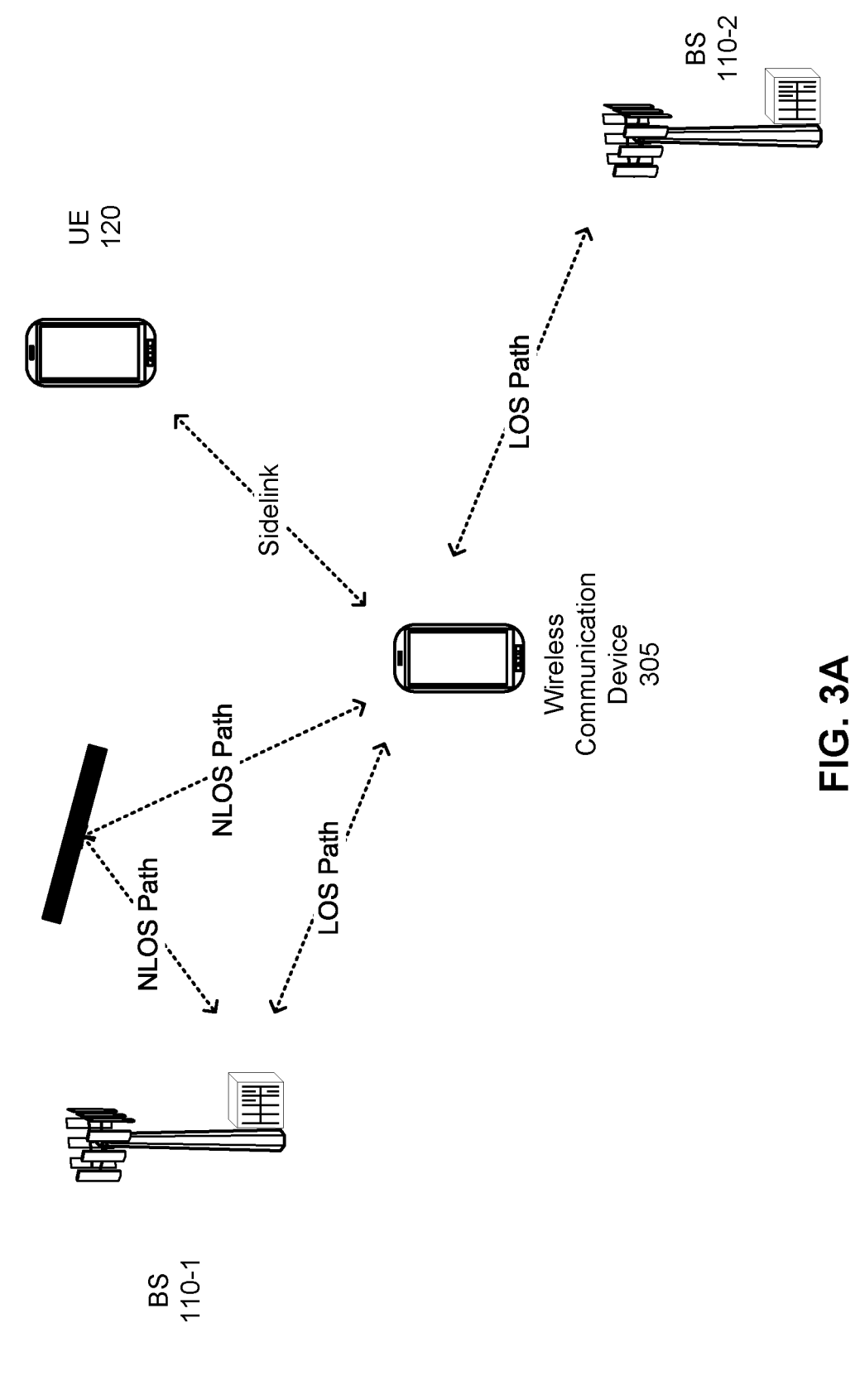
FIGS. 3A-3C are diagrams illustrating an example of synchronization reference source selection for clock synchronization, in accordance with the present disclosure.
Figure 3B:
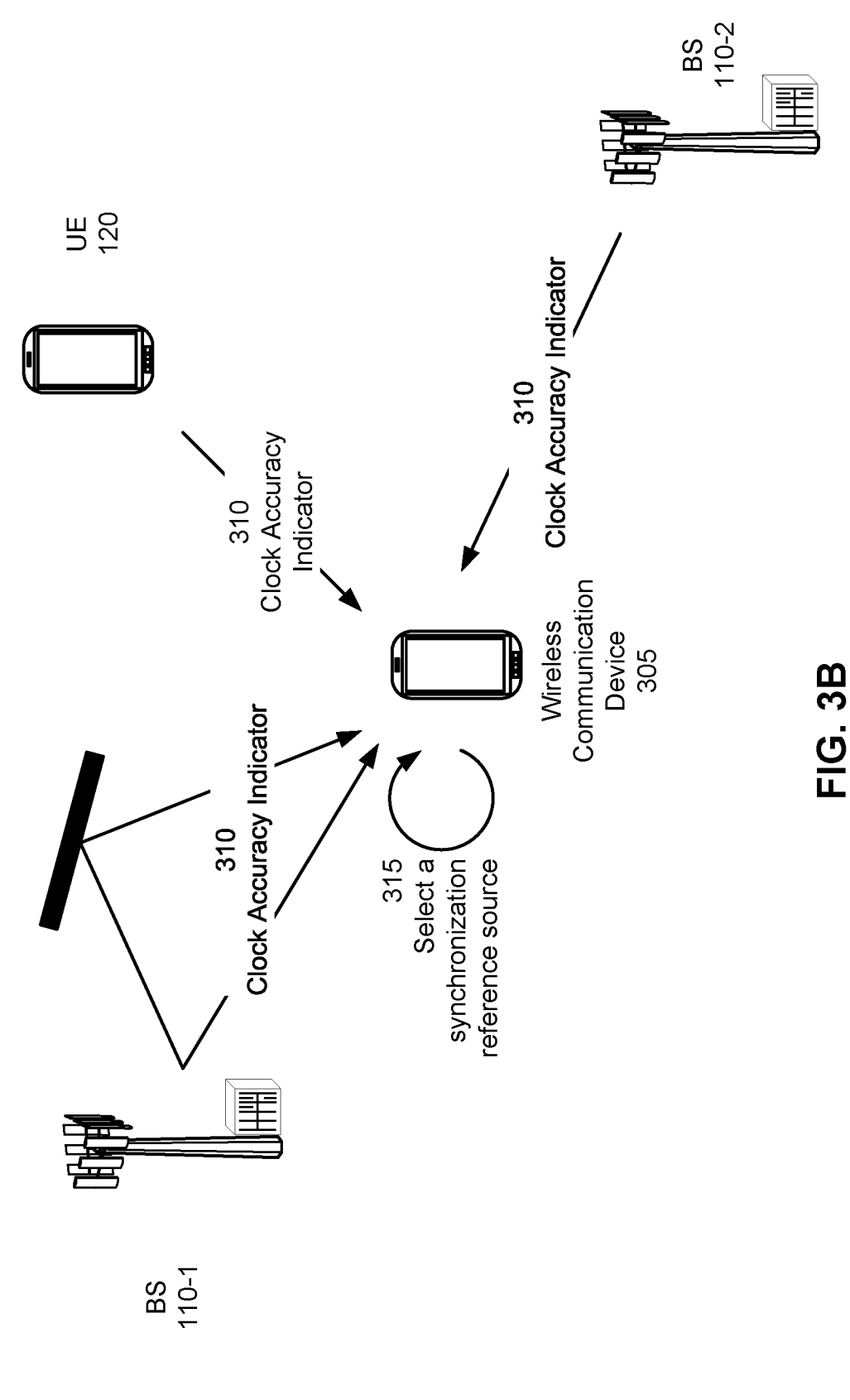
Figure 3C:
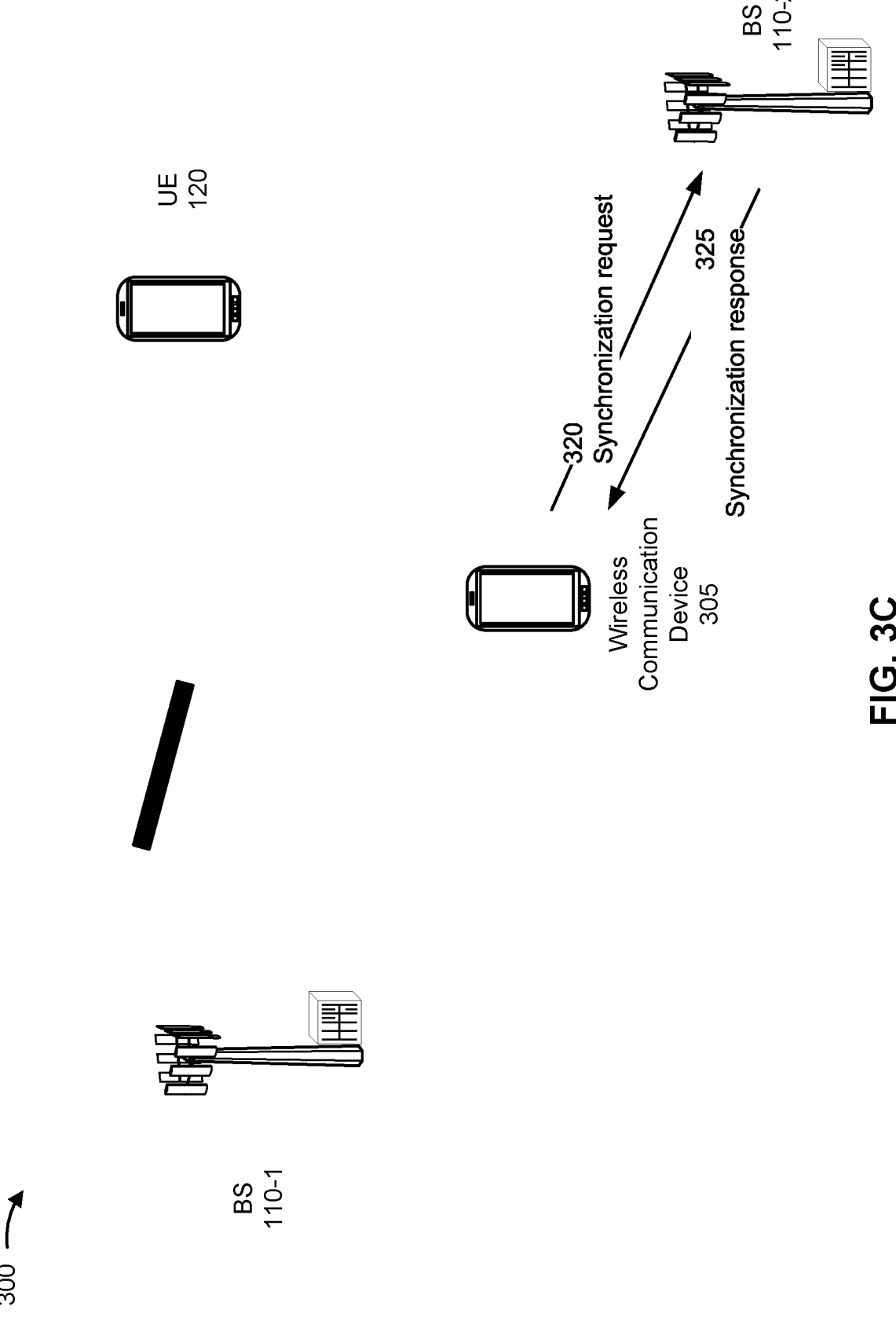

FIGS. 3A-3C are diagrams illustrating an example 300 of synchronization reference source selection for clock synchronization, in accordance with the present disclosure.

As shown in FIG. 3A, example 300 may include a wireless communication device (e.g., a UE 120 or a BS 110) in communication with one or more other devices in a network. For example, wireless communication device 305 may communicate with a UE 120 via a sidelink connection. Additionally, or alternatively, wireless communication device 305 may communicate with one or more BSs 110. For example, wireless communication device 305 may communicate with a BS 110-1 via an LOS path, an NLOS path (e.g., via a reflection of a signal off of an object, building, geographic feature, and/or the like), and/or the like. Similarly, wireless communication device 305 may communicate with another BS 110-2 (e.g., via an LOS path). In some aspects, other types of devices may be possible as synchronization reference sources, such as integrated access and backhauling (IAB) nodes, timing servers, central servers, serving BSs, location management functions (LMFs), and/or the like.

As shown in FIG. 3B, and by reference number 310, wireless communication device 305 may receive a set of clock accuracy indicators from a set of synchronization reference sources. For example, wireless communication device 305 may receive a first clock accuracy indicator from BS 110-1, a second clock accuracy indicator from UE 120, a third clock accuracy indicator from BS 110-2, and/or the like. In this case, wireless communication device 305 may receive the clock accuracy indicators via synchronization accuracy messages transmitted in master information blocks (MIBs), system information blocks (SIBs), radio resource control (RRC) messages, medium access control (MAC) control elements (CEs), downlink control information (DCI) messages), sidelink (SL) control information (SCI), SL MAC CE, SL-RRC, and/or the like. Additionally, or alternatively, wireless communication device 305 may receive a positioning protocol type of message (e.g., a higher layer NR positioning protocol A message that is transparent from the physical layer) to identify information associated with synchronizing a clock.

In some aspects, wireless communication device 305 may initiate a clock synchronization procedure. For example, wireless communication device 305 may transmit broadcast signaling, multicast signaling, unicast signaling, and/or the like to request clock synchronization with the set of synchronization reference sources. Additionally, or alternatively, one or more synchronization reference sources may periodically transmit information associated with enabling clock synchronization. For example, BS 110-1 may periodically broadcast, multicast, or unicast information identifying a clock accuracy, a link capacity or quality, and/or the like to wireless communication device 305 to enable wireless communication device 305 to select a synchronization reference source.

In some aspects, wireless communication device 305 may receive a clock accuracy indicator identifying a particular level of accuracy for synchronization. For example, a synchronization reference source may identify a level of accuracy of its own clock that is no higher than a level of accuracy of another clock from which the synchronization reference source synchronized its own clock. In other words, if UE 120 communicates with BS 110-1 to synchronize a first clock of UE 120 to a second clock of BS 110-1, UE 120 may transmit a clock accuracy indicator indicating a level of accuracy of the first clock that is less than or equal to a level of accuracy of the second clock.

In this case, a timing reference from which each other device in a network derives a network timing may be associated with a highest accuracy level and each other device may be associated with lower accuracy levels based at least in part on deriving the network timing from the timing reference or from another device that derived the network timing from the timing reference. In some aspects, each hop from the timing reference may correspond to a level of accuracy. For example, when BS 110-1 is the timing reference (e.g., a clock source with, for example, an atomic clock), BS 110-1 may be classified as having level 1 accuracy. In this case, UE 120 may communicate with BS 110-1 to synchronize a timing and may be classified as having level 2 accuracy. Further to the example, if wireless communication device 305 communicates with UE 120 to synchronize a timing, wireless communication device 305 may be classified as having level 3 accuracy. Other accuracy levels or synchronization scenarios may be possible.

In some aspects, an accuracy level may be based at least in part on a coverage status. For example, wireless communication device 305 may determine that UE 120 is out of a coverage area of a cell that includes wireless communication device 305 and may determine that an accuracy level of UE 120 is a lower level than synchronization reference sources within a coverage area of the cell. Additionally, or alternatively, wireless communication device 305 may determine the accuracy level based at least in part on a type of link, such as a sidelink, an access link, and/or the like.

In some aspects, wireless communication device 305 may determine the link capacity or quality for a link with a synchronization reference source. For example, wireless communication device 305 may determine a bandwidth, a link capacity or quality, a signal strength, and/or the like for the sidelink with UE 120, the LOS path with BS 110-1, the NLOS path with BS 110-1, and/or the like. Additionally, or alternatively, wireless communication device 305 may determine a PDP parameter. For example, wireless communication device 305 may determine a maximum delay path number, an amplitude for a path, a range of amplitudes for a path, a minimum amplitude for a path, a delay for a path (e.g., based at least in part on a timestamp), and/or the like. In some aspects, wireless communication device 305 may determine a communication type for a synchronization reference source. For example, based at least in part on receiving the clock accuracy indicators, wireless communication device 305 may determine whether a communication type is BS-UE communication, server-to-client communication, broadcast communication, multicast communication, UE-to-UE communication, peer-to-peer communication, and/or the like.

As further shown in FIG. 3B, and by reference number 315, wireless communication device 305 may select a synchronization reference source. For example, based at least in part on an accuracy indicator, a link capacity or quality, and/or the like, wireless communication device 305 may select BS 110-2 as a synchronization reference source with which to synchronize a clock of wireless communication device 305. Additionally, or alternatively, wireless communication device 305 may select the synchronization reference source based at least in part on one or more other factors, such as a PDP parameter, a communication type, a type of clock synchronization procedure that may be used, and/or the like.

In some aspects, wireless communication device 305 may rank tiers of synchronization reference sources and select the synchronization reference source based at least in part on the tier of the synchronization reference source. For example, wireless communication device 305 may identify one or more synchronization reference sources providing cells that wireless communication device 305 is accessing and may select a synchronization reference source, of the one or more synchronization reference sources providing cells, that has a highest accuracy level. In this case, when wireless communication device 305 does not identify a synchronization reference source providing a cell, wireless communication device 305 may identify one or more in-coverage-area sidelink synchronization reference sources and select a particular in-coverage-area sidelink synchronization reference source with a highest accuracy level. Further, when wireless communication device 305 does not identify an in-coverage-area sidelink synchronization reference source, wireless communication device 305 may identify an out-of-coverage area sidelink synchronization reference source from one or more out-of-coverage area sidelink synchronization reference sources that have clocks synchronized to in-coverage-area synchronization reference sources. Further, when wireless communication device 305 does not identify any out-of-coverage area sidelink synchronization reference sources that have clocks synchronized to in-coverage-area synchronization reference sources, wireless communication device 305 may identify and select from any out-of-coverage area sidelink synchronization reference sources that do not have clocks synchronized to in-coverage-area synchronization reference sources (e.g., that have clocks synchronized to other out-of-coverage area sidelink synchronization reference sources).

As shown in FIG. 3C, and by reference numbers 320 and 325, wireless communication device 305 may perform a clock synchronization procedure. For example, wireless communication device 305 may communicate using wireless RF signals with BS 110-2 to synchronize a first clock of wireless communication device 305 with a second clock of BS 110-2. The wireless communication device 305 may perform a synchronization procedure in accordance with a synchronization mode. The synchronization mode may include an RTT-based synchronization, unidirectional synchronization, and/or PDP-based synchronization, among other examples. In this case, wireless communication device 305 may transmit a message including a timestamp for the message, a mode type (e.g., RTT synchronization, unidirectional synchronization, and/or the like, and/or the like). For example, wireless communication device 305 may obtain one or more RTT measurements associated with one or more RF signals, one or more PDP measurements associated with one or more RF signals, and/or one or more unidirectional synchronization measurements associated with one or more RF signals, among other examples. Further to the example, for PDP-based synchronization, BS 110-2 may perform one or more PDP measurements and transmit a feedback message reporting the PDP measurements (e.g., as a list of reference signal received power (RSRP) measurements with different reference signals), one or more timestamps, and/or the like. The reference signals may include one or more positioning reference signals (e.g., a downlink positioning reference signal and/or a sounding reference signal for positioning).

The time offset between the BS 110-2 and the wireless communication device 305 may be determined by the cross validation between the PDP measurements of the BS 110-2 and the PDP measurements received from the wireless communication device 305. The earliest common peak in the two PDP measurements may be considered as the time offset, while the spurious early path detected only by one node due to noise may be rejected (e.g., as a form of outlier rejection). The earliest common peak can be either an LOS path in the channel or an NLOS path in the channel. The consideration of the NLOS path may differ from that of a positioning operation, in which LOS propagation time may be most valuable for location estimation.

Additionally, or alternatively, for unidirectional synchronization, BS 110-2 may forgo transmitting a response and may synchronize the second clock to align to the first clock. In some aspects, wireless communication device 305 may set a clock accuracy level of its own clock. For example, wireless communication device 305 may set the clock accuracy level for its own clock to less than or equal to that of a clock of BS 110-2. In this way, wireless communication device 305 may advertise a clock accuracy level for enabling other devices to synchronize to the clock of wireless communication device 305.

As indicated above, FIGS. 3A-3C are provided as an example. Other examples may differ from what is described with respect to FIGS. 3A-3C.

FIG. 4 is a flow chart of an example process 400 for reference source selection for clock synchronization. In some aspects, one or more process blocks of FIG. 4 may be performed by a wireless communication device (e.g., BS 110, UE 120, wireless communication device 305, and/or the like).

As shown in FIG. 4, process 400 may include selecting a synchronization reference source, of a plurality of available synchronization reference sources, based at least in part on a clock accuracy indicator of the synchronization reference source (block 410). For example, the wireless communication device (e.g., using controller/processor 240, controller/processor 280, and/or the like) may select a synchronization reference source, of a plurality of available synchronization reference sources, based at least in part on a clock accuracy indicator of the synchronization reference source, as described above.

As further shown in FIG. 4, process 400 may include communicating with the synchronization reference source to synchronize a first clock of the wireless communication device with a second clock of the synchronization reference source (block 420). For example, the wireless communication device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate with the synchronization reference source to synchronize a first clock of the wireless communication device with a second clock of the synchronization reference source, as described above.

Process 400 may include additional aspects, such as any single aspect or any combination of aspects described below and/or in connection with one or more other processes described elsewhere herein.

In a first aspect, selecting the synchronization reference source includes selecting the synchronization reference source based at least in part on determining the plurality of clock accuracy indicators.

In a second aspect, alone or in combination with the first aspect, the plurality of available synchronization reference sources includes at least one of: a cell of the wireless communication device, another wireless communication device in a coverage area of the wireless communication device, another wireless communication device outside the coverage area of the wireless communication device and with a clock source synchronized with yet another wireless communication device inside the coverage area of the wireless communication device, or another wireless communication device outside the coverage area of the wireless communication device and with a clock source synchronized with yet another wireless communication device outside of the wireless communication device.

In a third aspect, alone or in combination with the second aspect, the plurality of available synchronization reference sources are ordered based at least in part on a corresponding clock accuracy.

In a fourth aspect, alone or in combination with one or more of the first through third aspects, selecting the synchronization reference source includes selecting the synchronization reference source based at least in part on at least one of a link capacity or quality threshold or a source capability threshold.

In a fifth aspect, alone or in combination with one or more of the first through fourth aspects, process 400 includes setting a clock accuracy indicator of the wireless communication device based at least in part on the clock accuracy indicator of the synchronization reference source.

In a sixth aspect, alone or in combination with the fifth aspect, the clock accuracy indicator of the wireless communication device indicates a same level of accuracy as, or a lower level of accuracy than, the clock accuracy indicator of the synchronization reference source.

In a seventh aspect, alone or in combination with one or more of the first through sixth aspects, process 400 includes receiving signaling identifying the clock accuracy indicator of the synchronization reference source, wherein the signaling is being conveyed in at least one of: a master information is blocking, a system information is blocking, an RRC message, a MAC-CE, a higher layer protocol control message, a downlink control information, a sidelink control information, a sidelink MAC-CE, or a sidelink RRC message.

In an eighth aspect, alone or in combination with the seventh aspect, the signaling is received from at least one of a serving base station, a central server, a location management function, a time server, or a user equipment.

In a ninth aspect, alone or in combination with one or more of the seventh through eighth aspects, the signaling is a synchronization accuracy message identifying the clock accuracy indicator.

In a tenth aspect, alone or in combination with one or more of the first through ninth aspects, communicating with the synchronization reference source to synchronize the first clock of the wireless communication device with the second clock of the synchronization reference source includes obtaining one or more measurements associated with one or more RF signals.

In an eleventh aspect, alone or in combination with one or more of the first through tenth aspects, obtaining the one or more measurements includes obtaining the one or more measurements in accordance with a synchronization mode, and the synchronization mode comprises at least one of RTT synchronization, unidirectional synchronization, or PDP-based synchronization.

In a twelfth aspect, alone or in combination with the tenth aspect, the one or more measurements include at least one of an RTT measurement, a unidirectional synchronization measurement, or a PDP measurement.

In a thirteenth aspect, alone or in combination with the tenth aspect, process 400 includes determining an earliest common peak associated with a first PDP measurement obtained by the wireless communication device and a second PDP measurement received from the synchronization reference source, and determining a time offset between the wireless communication device and the synchronization reference source based at least in part on determining the earliest common peak.

In a fourteenth aspect, alone or in combination with the tenth aspect, the one or more radio frequency signals include one or more positioning reference signals.

In a fifteenth aspect, alone or in combination with the fourteenth aspect, the one or more positioning reference signals include at least one of a downlink positioning reference signal or a sounding reference signal for positioning.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The following provides an overview of some Aspects of the present disclosure:

Aspect 1: A method of wireless communication performed by a wireless communication device, comprising: selecting a synchronization reference source, of a plurality of available synchronization reference sources, based at least in part on a clock accuracy indicator of the synchronization reference source; and communicating with the synchronization reference source to synchronize a first clock of the wireless communication device with a second clock of the synchronization reference source.

Aspect 2: The method of Aspect 1, further comprising: determining a plurality of clock accuracy indicators for the plurality of available synchronization reference sources; and wherein selecting the synchronization reference source comprises: selecting the synchronization reference source based at least in part on determining the plurality of clock accuracy indicators. wherein selecting the synchronization reference source comprises: selecting the synchronization reference source based at least in part on determining the plurality of clock accuracy indicators.

Aspect 3: The method of either of Aspects 1 or 2, wherein the plurality of available synchronization reference sources includes at least one of: a cell of the wireless communication device, another wireless communication device in a coverage area of the wireless communication device, another wireless communication device outside the coverage area of the wireless communication device and with a clock source synchronized with yet another wireless communication device inside the coverage area of the wireless communication device, or another wireless communication device outside the coverage area of the wireless communication device and with a clock source synchronized with yet another wireless communication device outside of the wireless communication device.

Aspect 4: The method of Aspect 3, wherein the plurality of available synchronization reference sources are ordered based at least in part on a corresponding clock accuracy.

Aspect 5: The method of any of Aspects 1-4, wherein selecting the synchronization reference source comprises: selecting the synchronization reference source based at least in part on at least one of a link capacity or quality threshold or a source capability threshold.

Aspect 6: The method of any of Aspects 1-5, further comprising: setting a clock accuracy indicator of the wireless communication device based at least in part on the clock accuracy indicator of the synchronization reference source.

Aspect 7: The method of Aspect 6, wherein the clock accuracy indicator of the wireless communication device indicates a same level of accuracy as, or a lower level of accuracy than, the clock accuracy indicator of the synchronization reference source.

Aspect 8: The method of any of Aspects 1-7, further comprising: receiving signaling identifying the clock accuracy indicator of the synchronization reference source, wherein the signaling is conveyed in at least one of: a master information block, a system information block, a radio resource control (RRC) message, a medium access control (MAC) control element (MAC-CE), a higher layer protocol control message, a downlink control information, a sidelink control information, a sidelink MAC-CE, or a sidelink RRC message.

Aspect 9: The method of Aspect 8, wherein the signaling is received from at least one of a serving base station, a central server, a location management function, a time server, or a user equipment.

Aspect 10: The method of either of Aspects 8 or 9, wherein the signaling is a synchronization accuracy message identifying the clock accuracy indicator.

Aspect 11: The method of any of Aspects 1-10, wherein communicating with the synchronization reference source to synchronize the first clock of the wireless communication device with the second clock of the synchronization reference source comprises obtaining one or more measurements associated with one or more radio frequency signals.

Aspect 12: The method of any of Aspects 1-11, wherein performing the one or more measurements comprises performing the one or more measurements in accordance with a synchronization mode, wherein the synchronization mode comprises at least one of: round trip time synchronization, unidirectional synchronization, or power delay profile-based synchronization.

Aspect 13: The method of Aspect 11, wherein the one or more measurements comprise at least one of: a round trip time measurement, a unidirectional synchronization measurement, or a power delay profile measurement.

Aspect 14: The method of Aspect 11, further comprising determining an earliest common peak associated with a first power delay profile (PDP) measurement obtained by the wireless communication device and a second PDP measurement received from the synchronization reference source; and determining a time offset between the wireless communication device and the synchronization reference source based at least in part on determining the earliest common peak.

Aspect 15: The method of Aspect 11, wherein the one or more radio frequency signals comprise one or more positioning reference signals.

Aspect 16: The method of Aspect 15, wherein the one or more positioning reference signals comprise at least one of a downlink positioning reference signal or a sounding reference signal for positioning.

Aspect 17: An apparatus for wireless communication at a device, comprising a processor; memory coupled with the processor; and instructions stored in the memory and executable by the processor to cause the apparatus to perform the method of one or more Aspects of Aspects 1-16.

Aspect 18: A device for wireless communication, comprising a memory and one or more processors coupled to the memory, the memory and the one or more processors configured to perform the method of one or more Aspects of Aspects 1-16.

Aspect 19: An apparatus for wireless communication, comprising at least one means for performing the method of one or more Aspects of Aspects 1-16.

Aspect 20: A non-transitory computer-readable medium storing code for wireless communication, the code comprising instructions executable by a processor to perform the method of one or more Aspects of Aspects 1-16.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device, comprising:
one or more memories; and
one or more processors, operatively coupled to the one or more memories, individually or collectively configured to cause the wireless communication device to:
  select a synchronization reference source, of a plurality of available synchronization reference sources, based at least in part on a clock accuracy indicator of the synchronization reference source;
  obtain, from the synchronization reference source, one or more power delay profile (PDP) measurements associated with one or more radio frequency signals; and
  communicate, using the one or more radio frequency signals and with the synchronization reference source, to synchronize a first clock of the wireless communication device with a second clock of the synchronization reference source using a common peak associated with the one or more PDP measurements.

2. The wireless communication device of claim 1, wherein the one or more processors are individually or collectively configured to cause the wireless communication device to:
  determine a plurality of clock accuracy indicators for the plurality of available synchronization reference sources; and
  wherein the one or more processors, to select the synchronization reference source, are individually or collectively configured to cause the wireless communication device to:
    select the synchronization reference source based at least in part on determining the plurality of clock accuracy indicators.

3. The wireless communication device of claim 1, wherein the plurality of available synchronization reference sources includes at least one of:
  a cell of the wireless communication device,
  another wireless communication device in a coverage area of the wireless communication device,
  another wireless communication device outside the coverage area of the wireless communication device and with a clock source synchronized with yet another wireless communication device inside the coverage area of the wireless communication device, or
  another wireless communication device outside the coverage area of the wireless communication device and with a clock source synchronized with yet another wireless communication device outside of the wireless communication device.

4. The wireless communication device of claim 3, wherein the plurality of available synchronization reference sources are ordered based at least in part on a corresponding clock accuracy.

5. The wireless communication device of claim 1, wherein the one or more processors, to select the synchronization reference source, are individually or collectively configured to cause the wireless communication device to:
  select the synchronization reference source based at least in part on at least one of a link capacity or quality threshold or a source capability threshold.

6. The wireless communication device of claim 1, wherein the one or more processors are individually or collectively configured to cause the wireless communication device to:
  set a clock accuracy indicator of the wireless communication device based at least in part on the clock accuracy indicator of the synchronization reference source.

7. The wireless communication device of claim 6, wherein the clock accuracy indicator of the wireless communication device indicates a same level of accuracy as, or a lower level of accuracy than, the clock accuracy indicator of the synchronization reference source.

8. The wireless communication device of claim 1, wherein the one or more processors are individually or collectively configured to cause the wireless communication device to:
  receive signaling identifying the clock accuracy indicator of the synchronization reference source, wherein the signaling is conveyed in at least one of:
  a master information block,
  a system information block,
  a radio resource control (RRC) message,
  a medium access control (MAC) control element (MAC CE),
  a higher layer protocol control message,
  a downlink control information,
  a sidelink control information,
  a sidelink MAC CE, or
  a sidelink RRC message.

9. The wireless communication device of claim 8, wherein the signaling is received from at least one of a serving base station, a central server, a location management function, a time server, or a user equipment.

10. The wireless communication device of claim 8, wherein the signaling is a synchronization accuracy message identifying the clock accuracy indicator.

11. A method performed by a wireless communication device, comprising:
  selecting a synchronization reference source, of a plurality of available synchronization reference sources, based at least in part on a clock accuracy indicator of the synchronization reference source;
  obtaining, from the synchronization reference source, one or more power delay profile (PDP) measurements associated with one or more radio frequency signals; and
  communicating, using the one or more radio frequency signals and with the synchronization reference source, to synchronize a first clock of the wireless communication device with a second clock of the synchronization reference source using a common peak associated with the one or more PDP measurements.

12. The method of claim 11, further comprising:
  determining a plurality of clock accuracy indicators for the plurality of available synchronization reference sources; and
  wherein selecting the synchronization reference source comprises:
    selecting the synchronization reference source based at least in part on determining the plurality of clock accuracy indicators.

13. The method of claim 11, wherein the plurality of available synchronization reference sources includes at least one of:
  a cell of the wireless communication device,
  another wireless communication device in a coverage area of the wireless communication device, another wireless communication device outside the coverage area of the wireless communication device and with a clock source synchronized with yet another wireless communication device inside the coverage area of the wireless communication device, or another wireless communication device outside the coverage area of the wireless communication device and with a clock source synchronized with yet another wireless communication device outside of the wireless communication device.

14. The method of claim 13, wherein the plurality of available synchronization reference sources are ordered based at least in part on a corresponding clock accuracy.

15. The method of claim 11, wherein selecting the synchronization reference source comprises:

selecting the synchronization reference source based at least in part on at least one of a link capacity or quality threshold or a source capability threshold.

16. The method of claim 11, further comprising:

setting a clock accuracy indicator of the wireless communication device based at least in part on the clock accuracy indicator of the synchronization reference source.

17. The method of claim 16, wherein the clock accuracy indicator of the wireless communication device indicates a same level of accuracy as, or a lower level of accuracy than, the clock accuracy indicator of the synchronization reference source.

18. The method of claim 11, further comprising:

receiving signaling identifying the clock accuracy indicator of the synchronization reference source, wherein the signaling is conveyed in at least one of:

a master information block, a system information block, a radio resource control (RRC) message, a medium access control (MAC) control element (MAC CE), a higher layer protocol control message, a downlink control information, a sidelink control information, a sidelink MAC CE, or a sidelink RRC message.

19. The method of claim 18, wherein the signaling is received from at least one of a serving base station, a central server, a location management function, a time server, or a user equipment.

20. The method of claim 18, wherein the signaling is a synchronization accuracy message identifying the clock accuracy indicator.

21. A non-transitory computer-readable medium storing a set of instructions for wireless communication, the set of instructions comprising:

one or more instructions that, when executed by one or more processors of a wireless communication device, cause the wireless communication device to:

select a synchronization reference source, of a plurality of available synchronization reference sources, based at least in part on a clock accuracy indicator of the synchronization reference source;

obtain, from the synchronization reference source, one or more power delay profile (PDP) measurements associated with one or more radio frequency signals; and communicate, using the one or more radio frequency signals and with the synchronization reference source, to synchronize a first clock of the wireless communication device with a second clock of the synchronization reference source using a common peak associated with the one or more PDP measurements.

22. An apparatus for wireless communication, comprising:

means for selecting a synchronization reference source, of a plurality of available synchronization reference sources, based at least in part on a clock accuracy indicator of the synchronization reference source;

means for obtaining, from the synchronization reference source, one or more power delay profile (PDP) measurements associated with one or more radio frequency signals; and means for communicating, using the one or more radio frequency signals and with the synchronization reference source, to synchronize a first clock of the apparatus with a second clock of the synchronization reference source using a common peak associated with the one or more PDP measurements.

* * * * *